UNITED STATES PATENT OFFICE.

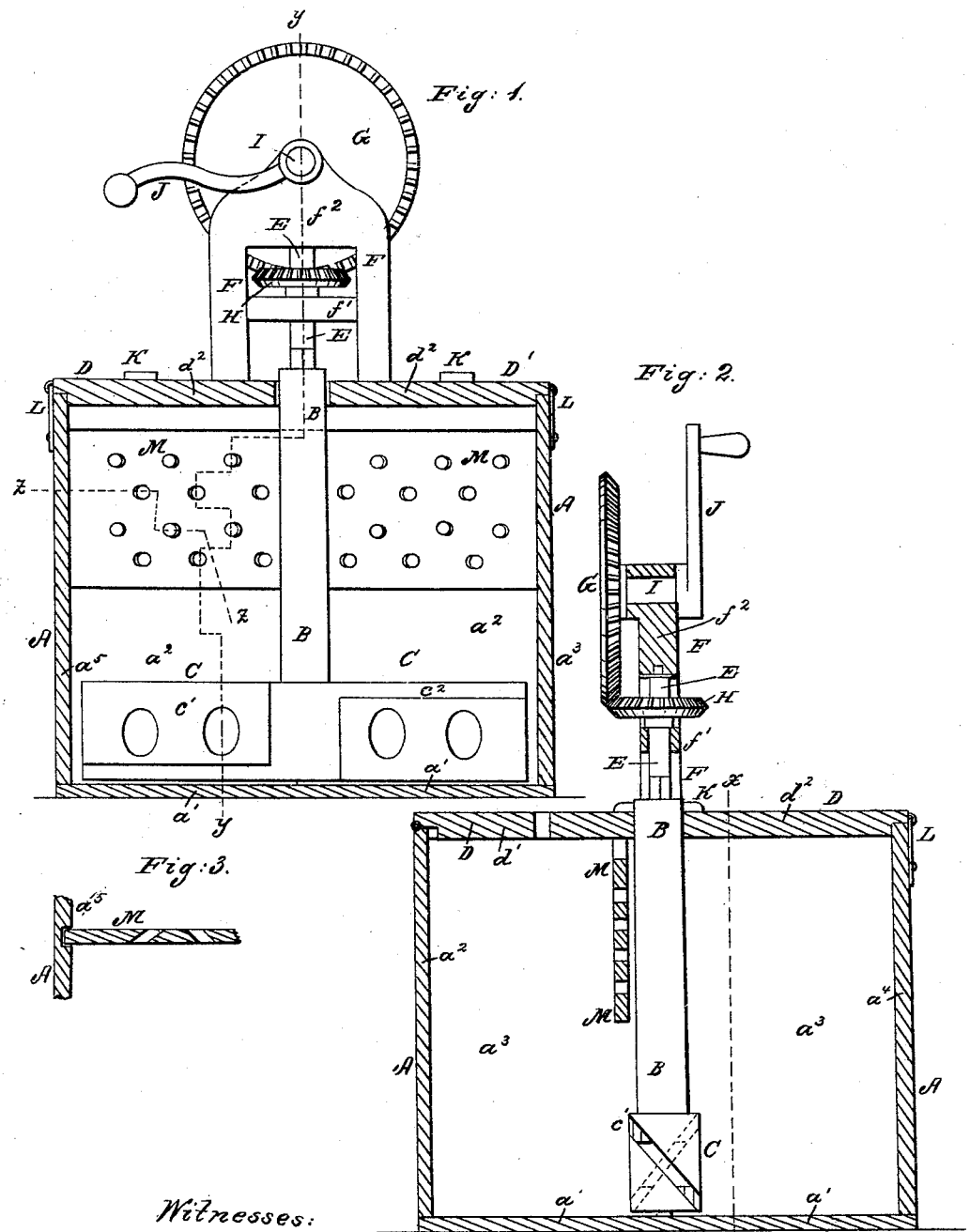

WM. BURSON AND D. C. BURSON, OF SALINEVILLE, OHIO.

IMPROVEMENT IN CHURNS.

Specification forming part of Letters Patent No. 58,059, dated September 18, 1866.

*To all whom it may concern:*

Be it known that we, WILLIAM BURSON and D. C. BURSON, of Salineville, in the county of Columbiana and State of Ohio, have invented a new and useful Improvement in Churns; and we do hereby declare that the following is a full, clear, and exact description thereof, which will enable others skilled in the art to make and use the same, reference being had to the accompanying drawings, forming part of this specification, in which—

Figure 1 is a vertical section of our improved churn, taken through the line $x$ $x$, Fig. 2. Fig. 2 is a section of the same, taken through the line $y$ $y$, Fig. 1. Fig. 3 is a detail sectional view of the same, taken through the line $z$ $z$, Fig. 1.

Similar letters of reference indicate like parts.

Our invention has for its object to furnish an improved churn, simple, durable, and cheap in construction, and which will break the cream as quick and gather the butter much quicker than the churns now in use; and it consists, first, of the dasher constructed as hereinafter more fully described, in combination with the shaft, gear-wheels, crank, supporting-frame, cover, and square box of the churn, the whole being constructed and arranged as described; and, second, in the combination of the perforated gathering-board with the box and dasher of the churn, as hereinafter more fully described.

The box A of the churn, which contains the cream, is made square, as shown in the drawings.

To the center of the bottom $a'$ of the box A is attached an upwardly-projecting point, which enters a socket formed in the lower end of the dasher-shaft B, and upon which the said shaft revolves. The dasher C is made in the form of two wings, $e'$ and $e^2$, projecting at right angles from the lower part of the shaft B, and which are set inclined, as shown in Fig. 2, so that the lower edges of the said wings $e'$ and $e^2$ may always be in advance, and tend to raise the cream from the lower part of the churn. These wings are perforated with horizontal holes, as shown in Figs. 1 and 2.

The shaft B passes up through a hole in the center of the cover D, and has a square socket formed in its upper end, into which the lower end of the shaft E fits, and by which it is revolved. The shaft E revolves in bearings in the cross-bars $f'$ and $f^2$ of the frame F, and has a bevel-gear wheel, H, attached to it, which meshes into the large bevel-gear wheel G, attached to the end of the crank-shaft I. The crank-shaft I revolves in bearings in the upper cross-bar, $f^2$, of the frame F, and to its other end is attached the crank J, by means of which motion is communicated to the dasher C. The lower ends of the uprights of the frame F are securely and permanently attached to the cover D. The cover D is made in two parts, one of which, $d'$, is hinged to the side $a^2$ of the box A, and the other part, $d^2$, to which the frame F is attached, is secured to the sides $a^3$, $a^4$, and $a^5$ of the box by hooks L, as shown in Figs. 1 and 2. The hinged part, $d'$, is held closed by buttons K, pivoted to the other part, $d^2$, in the ordinary manner.

M is the gathering-board, the ends of which are slid into vertical grooves formed in the sides $a^3$ and $a^5$ of the box A, as shown in Figs. 2 and 3. This board M is perforated with numerous oblique holes, as shown in Figs. 1 and 3, which allow the cream to pass through, but stop the butter, which gathers at the sides of the board M. This board is not placed in the churn until the cream has been broken and the butter begun to form.

In using the churn, the tendency of the dasher C is to raise the cream and sweep it into the corners of the box A, causing it to roll up in said corners, whence it falls back into the center of said box, causing a violent commotion and bringing the butter in a very short time.

What we claim as new, and desire to secure by Letters Patent, is—

1. The dasher C, when constructed as herein described, in combination with the shaft B, gear-wheels H and G, crank J, frame F, cover D, and box A, the said parts being constructed and arranged substantially as and for the purposes set forth.

2. The combination of the perforated gathering-board M with the box A and dasher C, substantially as described and for the purpose set forth.

WILLIAM BURSON.
D. C. BURSON.

Witnesses:
W. J. DALLAS,
H. C. ROBINS.